United States Patent
Ewing et al.

(10) Patent No.: US 12,342,747 B2
(45) Date of Patent: Jul. 1, 2025

(54) SYSTEMS AND METHODS FOR BIOCHAR-BASED SOIL CARBON SEQUESTRATION

(71) Applicant: CLIMATE LLC, St. Louis, MO (US)

(72) Inventors: Robert Ewing, Puyallup, WA (US); David Mack, Chesterfield, MO (US)

(73) Assignee: CLIMATE LLC, St. Louis, MO (US)

( * ) Notice: Subject to any disclaimer, the term of this patent is extended or adjusted under 35 U.S.C. 154(b) by 0 days.

(21) Appl. No.: 18/903,173

(22) Filed: Oct. 1, 2024

(65) Prior Publication Data

US 2025/0113767 A1    Apr. 10, 2025

Related U.S. Application Data

(60) Provisional application No. 63/587,858, filed on Oct. 4, 2023.

(51) Int. Cl.

| | | |
|---|---|---|
| *A01C 23/02* | (2006.01) | |
| *C09K 17/02* | (2006.01) | |
| *C10B 53/02* | (2006.01) | |
| *G01M 99/00* | (2011.01) | |
| *G01N 21/59* | (2006.01) | |

(52) U.S. Cl.
CPC ............ *A01C 23/022* (2013.01); *C09K 17/02* (2013.01); *C10B 53/02* (2013.01); *G01M 99/008* (2013.01); *G01N 21/59* (2013.01)

(58) Field of Classification Search
CPC ..... A01C 23/022; A01C 23/021; A01C 23/02; A01C 23/00; C09K 17/02; C09K 17/00; C10B 53/02; C10B 53/00; G01N 21/59; G01N 21/00; G01N 21/17; G01M 99/008; G01M 99/00
See application file for complete search history.

(56) References Cited

U.S. PATENT DOCUMENTS

| | | |
|---|---|---|
| 7,588,169 B1 | 9/2009 | Green et al. |
| 2015/0143806 A1* | 5/2015 | Friesth .................. F01K 13/02 220/592.2 |
| 2018/0347406 A1* | 12/2018 | Friesth .................. F24S 25/50 |
| 2020/0047228 A1 | 2/2020 | Kivioja |
| 2023/0036555 A1 | 2/2023 | Aramburu et al. |
| 2023/0392079 A1* | 12/2023 | Mulqueen ............... C01B 32/05 |

* cited by examiner

*Primary Examiner* — Christopher J. Novosad
(74) *Attorney, Agent, or Firm* — Michael VanEngelen

(57) ABSTRACT

In one embodiment is a carbon sequestration system that includes a crop residue pickup configured to ingest crop residue disposed on a field; a pyrolyzer configured to receive the crop residue output from the crop residue pickup and process the crop residue into biochar; a biochar/water or slurry mixing system configured to receive the biochar output from the pyrolyzer and quench the biochar in water and/or slurry; a soil injection system configured to receive the quenched biochar from the biochar/water or slurry mixing system and inject the quenched biochar into the field; and one or more sensors configured to detect one or more operations states of the crop residue pickup, the pyrolyzer, the biochar/water or slurry mixing system, and/or the soil injection system.

20 Claims, 3 Drawing Sheets

SYSTEMS AND METHODS FOR BIOCHAR-BASED SOIL CARBON SEQUESTRATION

CROSS-REFERENCE TO RELATED APPLICATION

This application claims priority to U.S. Provisional Application No. 63/587,858, filed Oct. 4, 2023, the content of which is incorporated herein by reference in its entirety.

FIELD

The present disclosure generally relates to the field of carbon sequestration, and more particularly relates in one embodiment to a pyrolyzer and systems and methods for monitoring the operations of the pyrolyzer and other associated devices as described below.

BACKGROUND

This section provides background information related to the present disclosure which is not necessarily prior art.

In an effort to reverse the effects of climate change, effective methods to sequester carbon have become an active field of research. In particular, the farm has become regarded as an attractive location for carbon sequestration, primarily because of the large quantities of carbon-rich materials (e.g., crop residue) that are present on the farm. To that end, governments and businesses around the world have instituted programs such as carbon credits to incentivize carbon sequestration. However, carbon sequestration on the farm, and administering a carbon credit program thereof, have several challenges. The first problem is carbon permanence. Successful soil carbon sequestration requires permanence, that is, that the sequestered carbon will remain sequestered, or remain in the ground, for several decades or even centuries. Some conventional methods of carbon sequestration on the farm cannot guarantee permanence. For example, a farmer on a field may earn carbon credits by changing his or her farming practices from conventional plowing to no-till. But if the farmer reverts to conventional tillage, the carbon may quickly return to the atmosphere, undoing the sequestration.

This problem of carbon permanence may be solved by using biochar. Biochar production is a technique through which carbon from certain biomasses is transformed into a stable form that can be placed in the soil. In addition to this long-term carbon sequestration role, biochar is also beneficial to soil performance as it improves the retention and diffusion of water and nutrients. Biochar is produced by treating waste, such as crop residue, in high-temperature furnaces in an oxygen-limited environment. Through this treatment, the crop residue is converted into a solid, porous, carbon-rich, and stable material.

However, using biochar as an avenue for carbon sequestration has its own challenges. In particular, to administer a carbon credits program, the entity in charge, such as a carbon registry, will require an accurate accounting of the amount of carbon that has been sequestered. Due to this accounting requirement, most carbon registries currently do not accept generating biochar as a way to sequester carbon. This is because generally, the only sure way to verify carbon sequestration is to sample the soil. But biochar that is placed below the soil surface may occupy only small lines, for example at 1 foot deep and 30 inches apart, such that accurately sampling for the injected biochar would be prohibitively expensive. Efforts are now underway to evaluate other methods of biochar detection, such as subsurface spectroscopy, but these methods are likewise impractically expensive.

The above information is presented as background information only to assist with an understanding of the instant disclosure. No determination has been made, and no assertion is made, as to whether any of the above might be applicable as prior art with regard to the instant disclosure.

SUMMARY

This section provides a general summary of the disclosure and is not a comprehensive disclosure of its full scope or all of its features.

In one example embodiment, the instant disclosure discloses a novel mobile pyrolyzer with a monitoring system that solves the problems described above. First, with respect to the problem of carbon permanence, the mobile pyrolyzer converts crop residue to biochar, which as described above is biologically stable in the soil. That is, biochar will not decay and release carbon to the extent that untreated crop residue would. In one embodiment, the mobile pyrolyzer also includes an injection system that injects the biochar produced by the pyrolyzer into the soil, and a sensor system that monitors the biochar production and injection. And therefore, with respect to the problem of verifying the amount of carbon sequestered, the mobile pyrolyzer includes one or more sensors that accurately capture the amount of carbon to be sequestered before the carbon is injected into the soil. Because the amount of carbon is measured before sequestration, other after-the-fact methods of measuring the amount of carbon sequestered, such as soil sampling, are not needed.

Example embodiments of the present disclosure generally relate to the above-described system and method. In one example embodiment, such a system generally includes a crop residue pickup configured to ingest crop residue disposed on a field; a pyrolyzer configured to receive the crop residue output from the crop residue pickup and process the crop residue into biochar; a biochar/water or manure slurry mixing system configured to receive the biochar output from the pyrolyzer and quench the biochar in water and/or slurry; a soil injection system configured to receive the quenched biochar from the biochar/water or slurry mixing system and inject the quenched biochar into the field; one or more sensors configured to detect one or more operations states of the crop residue pickup, the pyrolyzer, the biochar/water or slurry mixing system, and/or the soil injection system In addition, in another example embodiment, there may be a computer-based system for processing the several sensors' data into a data stream that can provide evidence or traceability of carbon sequestration in the form of biochar injection.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Figure 1:
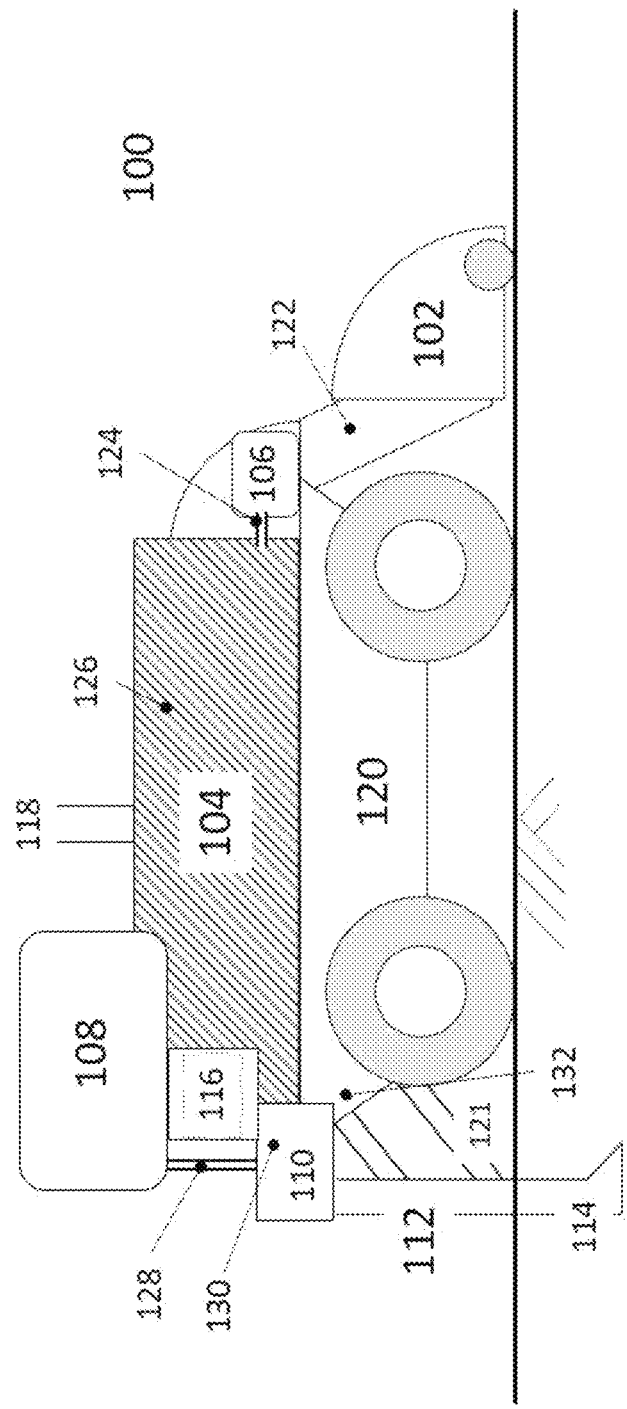
FIG. 1 illustrates an example carbon sequestration system.

FIG. 1 illustrates an example carbon sequestration system 100. FIG. 1 illustrates an example system 100 in which one or more aspect(s) of the present disclosure may be implemented. Although the system 100 is presented in one arrangement, other embodiments may include the parts of the system 100 (or other parts) arranged otherwise. In one embodiment, the example carbon sequestration system 100 is a mobile biochar production and injection system. The components of the carbon sequestration system 100 in this example rest on a mobile platform 120. The mobile platform 120 may be pulled by a tractor or some other agricultural vehicle, or may move under its own power by incorporating an internal combustion engine or an electric motor (not shown). In the example of being pulled by a tractor, the carbon sequestration system 100 may be hitched to the back of the tractor and then may be pulled to traverse the rows of a farm. Crop residue on the ground may be collected by the crop residue pickup 102. In one embodiment, the crop residue pickup 102 is a pickup header commonly used in agricultural harvesters. The crop residue pickup 102 gathers and compresses the crop residue and feeds it to the pyrolyzer 104. The pyrolyzer 104 turns the crop residue into biochar by heating the crop residue to a high temperature (600 degrees Fahrenheit or more) in an oxygen-limited environment for a certain period of time, such as five minutes.

There are several ways in which this process of creating biochar can negate the benefits of using biochar for the purposes of carbon sequestration. First, heating the pyrolyzer to a high temperature requires fuel. If fossil fuels are used, then the process may release more carbon into the air than the amount of carbon captured by the biochar, and thus would be a net-negative for the environment. Second, upon being heated, the crop residue releases volatile gases such as methane, which is a greenhouse gas. If these volatile gases are released into the atmosphere, they may also defeat the purpose of this entire exercise.

In order to minimize carbon production while processing the biochar, the carbon sequestration system 100 advantageously uses the volatile gases released by the crop residue as the fuel for the pyrolysis process. To that end, the carbon sequestration system 100 includes an initiating fuel source 106, which is connected to the pyrolyzer 104 and contains a small amount of fuel to kick start the pyrolysis process. In one embodiment, the initiating fuel source 106 may be a propane tank. However, once pyrolysis is underway, the volatile gases driven off from the crop residue are captured by the outgas recovery 116 and are fed back into the fuel intake of the pyrolyzer 104 (not shown) to sustain pyrolysis. In this way, only a small amount of fuel is initially used by the pyrolyzer 104, and once the pyrolysis process becomes self-sustaining by only consuming the gases generated from the pyrolysis process itself, the valve to the initiating fuel source 106 may be shut off. Gases and byproducts generated during pyrolysis and combustion, including carbon dioxide and water, may be released into the air via the exhaust 118.

As the produced biochar comes out of the pyrolyzer 104, it is hot and could readily combust, so it should be quickly cooled. The biochar may be cooled and quenched by water, but more advantageously, the biochar may be cooled and quenched by inoculating it with a live solution, for example a manure slurry. A manure slurry has live microbes and other substances that will readily bind with the fresh biochar, substances such as fatty acids, ammonia, amino acids, and the like. These will bind and/or react with the biochar and make it easier for microbes to colonize the surfaces of the biochar. This way, combining the biochar with a manure slurry makes it more attractive to plant roots, which improves the field's productivity. To that end, as shown in FIG. 1, biochar output from the pyrolyzer 104 is placed into the biochar/water or slurry mixing system 110. The water and/or manure slurry in the mixing system 110 is provided by the water or slurry tank 108.

After being cooled and optionally treated with water and/or slurry, the biochar can then be injected, or knifed, into the ground. To that end, the biochar is output from the biochar/water or slurry mixing system 110 and transferred to the soil injection system 112, which includes the injection tines 114. The height of the injection tines 114 may be controlled by onboard hydraulics, which are shown in FIG. 1 as the diagonal structures 121 attached to the soil injection system 112. In one example, the biochar may be injected into the root zone of the plants currently growing on the field, and one injection may be performed for every four plant rows to reduce soil disturbance.

To accurately capture and document the amount of biochar created and injected by the carbon sequestration system 100, the carbon sequestration system 100 may include a suite of sensors configured to measure various aspects of its operation. In the example embodiment shown in FIG. 1, the carbon sequestration system 100 may include one or more crop residue pickup sensors 122, one or more initiating fuel source valve sensors 124, one or more pyrolyzer temperature sensors 126, one or more water or slurry flow sensors 128, one or more biochar quantity sensors 130, and/or one or more injection system depth sensors 132. In another example embodiment (not shown) in which the carbon sequestration system 100 is pulled by a tractor, there may be additional sensors to measure or detect the location of the carbon sequestration system 100 by using, for example, GPS, temperature and power output of the engine of the tractor, torque and slippage of the wheels of the tractor and/or the carbon sequestration system 100, possible towbar resistance, etc.

The crop residue pickup sensors 122 may detect whether the crop residue pickup equipment is operating and may detect how much crop residue is being ingested by the pickup equipment and fed into the pyrolyzer. The initiating fuel source valve sensors 124 may detect whether the valve of the initiating fuel source 106 is open. Based on the detected amount of time the valve is open, and a known flow rate, a computer system in communication with the initiating fuel source valve sensors 124 may determine how much initiating fuel is consumed. The pyrolyzer temperature sensors 126 may detect the temperature inside the pyrolyzer chamber. The water or slurry flow sensors 128 may detect whether and how much water or slurry is flowing from the water or slurry tank 108 to the biochar/water or slurry mixing system 110. In one embodiment, the water or slurry flow sensors 128 may be implemented using valve and flow meters. The biochar quantity sensors 130 may detect the quantity of biochar output from the pyrolyzer 104. In one embodiment, the biochar quantity sensors 130 may include a toothed wheel that is turned by the biochar material falling through the wheel. The amount of rotation of the toothed wheel correlates to the amount of biochar produced by the pyrolyzer 104. It should be noted that the biochar quantity sensors 130 may be implemented in other ways. For example, the biochar quantity sensors 130 may be implemented via batch weighing. In batch weighing, freshly produced biochar may fall into a cup or another type of receptable. When the contents of the cup reach a certain weight threshold, it may be emptied, and the cup may then receive additional biochar. In another embodiment, the biochar quantity sensors 130 may be implemented using light interception, in which biochar falls or flows between a light source and light sensor, and the quantity of light intercepted corresponds to the quantity of biochar. In yet another embodiment, the biochar quantity sensors 130 may be implemented using a centripetal force flow meter.

Finally, the injection system depth sensors 132 may detect whether and how deep the injection tines 114 are in the soil. The sensor data from these various sensors may be wirelessly transmitted or transmitted via a wire to an agricultural computing platform described below. The agricultural computing platform may then use the sensor data to determine how much, if any, biochar is produced and injected into the ground. For example, as explained above, the agricultural computing platform may use data regarding the amount of rotation of the toothed wheel to determine how much biochar is produced. But if the injection system depth sensors 132 detect that the injection tines 114 are in the "up" position, the agricultural computing platform may determine that biochar is being produced, but it is not being injected into the ground. Conversely, if the injection system depth sensors 132 detect that the injection tines 114 are in the "down" position, or that the tip of the injection tines are below ground level by a predetermined threshold, the agricultural computing platform may determine that the biochar being produced is being injected into the ground.

It should be noted that the various components of the carbon sequestration system 100 need not necessarily always be disposed on the mobile platform 120. Instead, in various other embodiments, the components of the carbon sequestration system 100 may be fashioned in a modular manner, such that during operation, certain components traverse the field while other components are stationary. For example, in the tractor-towed embodiment, a tractor or another vehicle may tow the carbon sequestration system 100 to the field where carbon sequestration will take place. The pyrolyzer 104, the initiating fuel source 106, the outgas recovery 116, the exhaust 118, the water or slurry tank 108, the biochar/water or slurry mixing system 110, and associated sensors may be removed from the mobile platform 120 and be placed at the edge of the field. The mobile platform 120, along with the remaining components—the crop residue pickup 102 and the soil injection system 112 and associated sensors—may be pulled by the tractor to traverse the field. Crop residue is picked up by the crop residue pickup 102 and temporarily stored on the mobile platform 120. At given time intervals, the tractor may return to the pyrolyzer 104 at the edge of the field to feed the collected residue into the pyrolyzer 104. Once the biochar is outputted from the biochar/water or slurry mixing system 110, it may then be placed back onto the mobile platform 120 and fed into the soil injection system 112 to be knifed into the soil, as the tractor pulls the mobile platform 120 to traverse the field once again.

In yet other embodiments, the crop residue pickup 102 and the soil injection system 112 and associated sensors can also be made modular and be made to be separable from the mobile platform. For example, continuing from the embodiment described immediately above, once the pyrolyzer 104 and the biochar/water or slurry mixing system 110 are offloaded from the mobile platform 120, the crop residue pickup system 102 and the soil injection system 112 can also be offloaded from the mobile platform 120 to be placed on one or more smaller mobile platforms (not shown) to be pulled by the tractor to traverse the field.

Figure 2:
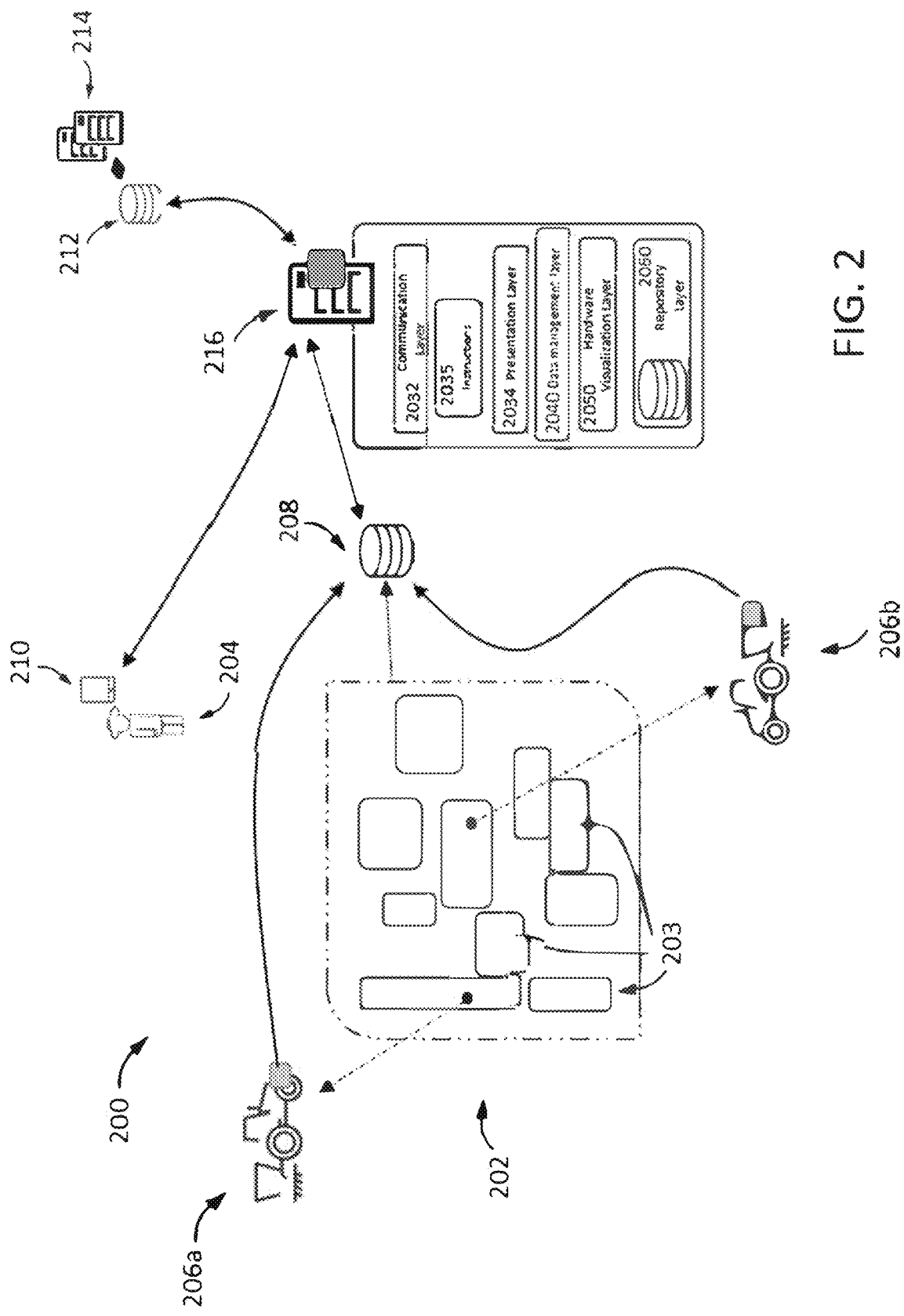
FIG. 2 illustrates an example system for processing the sensor data generated by the carbon sequestration system of FIG. 1.

FIG. 2 illustrates an example system 200 in which one or more aspect(s) of the present disclosure may be implemented. Although the system 200 is presented in one arrangement, other embodiments may include the parts of the system 200 (or other parts) arranged otherwise depending on, for example, relationships between users, farm equipment and fields; data flows; types of crops included in fields; types and/or locations of fields; planting and/or harvest activities; privacy and/or data requirements; etc.

As shown, the system 200 generally includes a growing space 202, which is divisible into different fields 203. The fields 203 may be distributed through a region, whereby some fields 203 may be adjacent to one another, while other fields 203 are spaced apart from one another. In general, the fields 203 are owned, operated and/or managed by user 204. In this way, the user 204 may include a farmer, or a grower business or entity, which is in the business of planting, growing, harvesting, and selling the crops. As such, the user 204 is a person, or group of people, which are responsible for making decisions related to the fields 203. For example, the user 204 may decide what crops/seeds to plant within the fields 203, what management practices to employ, whether to initiate a program for carbon sequestration on the fields 203, and when to harvest the crop, etc.

In this example embodiment, the user 204 is associated with ten separate fields 203 within the growing space 202. It should be appreciated that the user may be associated with dozens, or hundreds, or even thousands of fields, depending on, for example, the type of user.

It should be understood that other system embodiments may include numerous users and associated fields, which are managed by the users.

In the illustrated system 200, the fields 203 included in the growing space 202 historically have been planted and harvested, whereby data (e.g., agronomic data, etc.) is gathered at or from the growing space 202. The data may be gathered manually, or automatically, for example, by farm equipment, etc. The data may include plant/seed identifiers, plant/seed types, planting dates, location data, field identifiers, soil conditions, plant performance (e.g., height, strength, yield, etc.) (e.g., at one or more regular or irregular interval(s), etc.), plant growth stages, treatments, weather conditions, carbon sequestration data, and other suitable data to identify the seed/plant and/or a performance of the seed/plant, etc. In this particular instance, biochar production and injection data may be gathered.

In addition to the growing space 202 in FIG. 2, the system 200 also includes some agricultural equipment (e.g., equipment 206a-b, etc.), a data server 208 (or multiple data servers), and an agricultural computer system 216, each of which is coupled to (and is in communication with) one or more network(s). The network(s) is/are indicated generally by arrowed lines in FIG. 2, and may each include, without limitation, one or more of a local area network (LAN), a wide area network (WAN) (e.g., the Internet, etc.), a mobile/cellular network, a virtual network, and/or another suitable public and/or private network capable of supporting communication among parts of the system 200 illustrated in FIG. 2, or any combination thereof.

In this example embodiment, the agricultural equipment includes carbon sequestration systems 206a and 206b, each disposed in one of the fields 203 in the growing space 202. As described above, each of the carbon sequestration systems 206a and 206b may traverse the fields 203 to ingest crop residue, process biochar, and inject the biochar into the soil. During these operations, the carbon sequestration systems 206a and 206b also generate sensor data that may be transmitted to the data server 208. The data server 208, in turn, is configured to store the received data in one or more data structures.

The data server 208 is communicatively coupled to the agricultural computer system 216 and is programmed, or configured, to send external data (e.g., data associated with the fields 203 in the growing space 202, etc.) to agricultural computer system 216 via the network(s) herein (e.g., for use in recording the amount of biochar injected into the soil). The data server 208 may be owned or operated by the same legal person or entity as the agricultural computer system 216, or by a different person or entity, such as a government agency, non-governmental organization (NGO), and/or a private data service provider.

The network(s) of the system 200 are generally illustrated in FIG. 2 by arrowed lines. In connection therewith, the network(s) broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 2. The various elements of FIG. 2 may also have direct (wired or wireless) communications links. For instance, the carbon sequestration systems 206a-b in the system 200, data server 208, agricultural computer system 216, and other elements of the system 200 may each comprise an interface compatible with the network(s) and programmed, or configured, to use standardized protocols for communication across the networks, such as TCP/IP, Bluetooth, CAN protocol and higher-layer protocols, such as HTTP, TLS, and the like.

Agricultural computer system 216 is programmed, or configured, to receive field data from field manager computing device 210, external data 212 from data server 214, and sensor data from one or more sensors in the system 200. Agricultural computer system 216 may be further configured to host, use or execute one or more computer programs, other software elements, digitally programmed logic, such as FPGAs or ASICs, or any combination thereof to perform various digital operations.

In an embodiment, agricultural computer system 216 is programmed with or comprises a communication layer 2032, a presentation layer 2034, a data management layer 2040, a hardware visualization layer 2050, and a model and field data repository layer 2060. "Layer," in this context, refers to any combination of electronic digital interface circuits, microcontrollers, firmware, such as drivers, and/or computer programs, or other software elements.

Communication layer 2032 may be programmed, or configured, to perform input/output interfacing functions including sending requests to field manager computing device 210, data server 208, and remote sensor(s) for field data, external data, and sensor data respectively. Communication layer 2032 may be programmed, or configured, to send the received data to model and field data repository layer 2060 to be stored as field data (e.g., in computer system 216, etc.).

Presentation layer 2034 may be programmed, or configured, to generate a graphical user interface (GUI) to be displayed on field manager computing device 210 or other computers that are coupled to the system 216 through the network(s). The GUI may comprise controls for inputting data to be sent to agricultural computer system 216, displaying data such as the amount of biochar sequestered, etc.

Data management layer 2040 may be programmed, or configured, to manage read operations and write operations involving the repository layer 2060 and other functional elements of the system, including queries and result sets communicated between the functional elements of the system and the repository. Examples of data management layer 2040 include JDBC, SQL server interface code, and/or HADOOP interface code, among others. Repository layer 2060 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

In an example embodiment, the agricultural computer system 216 is programmed to generate and cause displaying of a graphical user interface comprising a data manager for data input. After one or more fields have been identified by the user 204, the data manager may provide one or more graphical user interface widgets which when selected can identify changes to the field, soil, crops, tillage, carbon sequestration, or nutrient practices for the field(s) 203. The data manager may include a timeline view, a spreadsheet view, a graphical view, and/or one or more editable programs.

In an embodiment, model and field data are stored in model and field data repository layer 2060. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

With further reference to FIG. 2, in an embodiment, instructions 2035 of the agricultural computer system 216 may comprise a set of one or more pages of main memory, such as RAM, in the agricultural computer system 216 into which executable instructions have been loaded and which when executed cause the agricultural computer system 216 to perform the functions or operations that are described herein. For example, the instructions 2035 may comprise a set of pages in RAM that contain instructions which, when executed, cause performing one or more functions implementing the systems and methods described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, the instructions 2035 also may represent one or more files or projects of source code that are digitally stored in a mass storage device, such as non-volatile RAM or disk storage, in the agricultural computer system 216 or a separate repository system, which when compiled or interpreted cause generating executable instructions which when executed cause the agricultural computer system 216 to perform the functions or operations that are described herein. In other words, the drawing figure may represent the manner in which programmers or software developers organize and arrange source code for later compilation into an executable, or interpretation into bytecode or the equivalent, for execution by the agricultural computer system 216.

Figure 3:
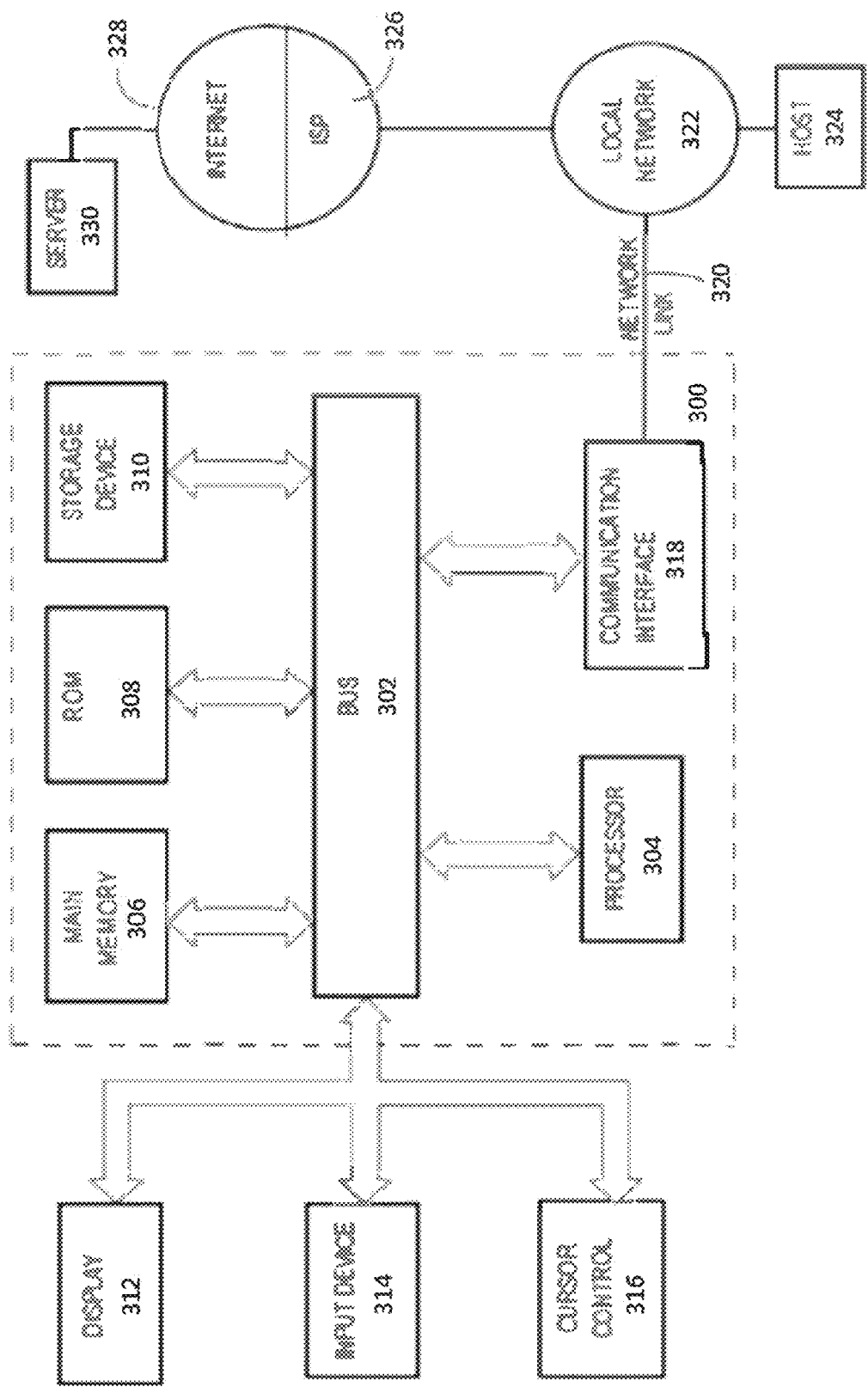
FIG. 3 illustrates an example implementation architecture that may be included and/or implemented in a computer system of FIG. 1-2, for use in performing one or more of the functions described herein.

Hardware visualization layer 2050 comprises one or more central processing units (CPUs), memory controllers, and other devices, components, or elements of a computer system, such as volatile or non-volatile memory, non-volatile storage, such as disk, and I/O devices or interfaces as illustrated and described, for example, in connection with FIG. 3. The layer 2050 also may comprise programmed instructions that are configured to support virtualization, containerization, or other technologies.

For purposes of illustrating a clear example, FIG. 2 shows a limited number of instances of certain functional elements. However, in other embodiments, there may be any number of such elements. For example, embodiments may use thousands or millions of different mobile computing devices 210 associated with different users. Further, the system 216 and/or data server 208 may be implemented using two or more processors, cores, clusters, or instances of physical machines or virtual machines, configured in a discrete location or co-located with other elements in a datacenter, shared computing facility or cloud computing facility.

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for disclosures of this type.

In an embodiment, user 204 interacts with agricultural computer system 216 using field manager computing device 210 configured with an operating system and one or more application programs or apps. The field manager computing device 210 also may interoperate with the agricultural computer system 216 independently and automatically under program control or logical control and direct user interaction is not always required. Field manager computing device 210 broadly represents one or more of a smart phone, PDA, tablet computing device, laptop computer, desktop computer, workstation, or any other computing device capable of transmitting and receiving information and performing the functions described herein. Field manager computing device 210 may communicate via a network using a mobile application stored on field manager computing device 210, and in some embodiments, the device may be coupled using a cable or connector to one or more sensors and/or other apparatus in the system 200. A particular user 204 may own, operate or possess and use, in connection with system 200, more than one field manager computing device 210 at a time.

The mobile application associated with the field manager computing device 210 may provide client-side functionality, via the network to one or more mobile computing devices. In an example embodiment, field manager computing device 210 may access the mobile application via a web browser or a local client application or app. Field manager computing device 210 may request data from, transmit data to, and receive data from, one or more front-end servers, using web-based protocols, or formats, such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 210 which determines the location of field manager computing device 210 using standard tracking techniques, such as multilateration of radio signals, the global positioning system (GPS), WiFi positioning systems, or other methods of mobile positioning. In some cases, location data or other data associated with the device 210, user 204, and/or user account(s) may be obtained by queries to an operating system of the device or by requesting an app on the device to obtain data from the operating system.

In an embodiment, in addition to other functionalities described herein, field manager computing device 210 sends field data to agricultural computer system 216 comprising or including, but not limited to, data values representing one or more of: a geographical location of the one or more fields, tillage information for the one or more fields, crops planted in the one or more fields, and soil data extracted from the one or more fields. Field manager computing device 210 may send field data in response to user input from user 204 specifying the data values for the one or more fields. Additionally, field manager computing device 210 may automatically send field data when one or more of the data values becomes available to field manager computing device 210. For example, field manager computing device 210 may be communicatively coupled to a remote sensor in the system 200, and in response to an input received at the sensor, field manager computing device 210 may send field data to agricultural computer system 216 representative of the input. Field data identified in this disclosure may be input and communicated using electronic digital data that is communicated between computing devices using parameterized URLs over HTTP, or another suitable communication or messaging protocol. In that sense, in some aspects of the present disclosure, the field data provided by the field manager computing device 210 may also be stored as external data (e.g., where the field data is collected as part of harvesting crops from the growing space 202, etc.), for example, in data server 208.

A commercial example of the mobile application is CLIMATE FIELDVIEW, commercially available from Climate LLC, Saint Louis, Missouri. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

With respects to one or more embodiments of the present disclosure, carbon sequestration systems 206a and 206b may transmit various pieces sensor data to the data server 208, which in one embodiment may implement the CLIMATE FIELDVIEW platform. Using the sensor data and location information such as GPS coordinates from the tractor pulling the carbon sequestration system 100 or from the carbon sequestration system 100 itself, the field manager computing device 210 and/or the agricultural computer system 216 can determine whether biochar is produced and injected into the ground and how much biochar is sequestered. This accurate accounting of biochar sequestration can enable carbon registries from around the world to issue carbon credits for biochar sequestration.

Further, in one embodiment of the present disclosure, the agricultural computer system 216 may use additional information to verify the sensor data from the carbon sequestration systems. For example, the agricultural computer system 216 may be in receipt of satellite images of the growing space 202. Conventional algorithms known in the art can be used to determine or estimate the amount of crop on a particular field 203 based on that satellite images. This estimated crop amount can be compared with the sensor data from the carbon sequestration systems 206a and 206b to ensure, for example, that the amount of crop residue being ingested by the carbon sequestration systems 206a and 206b is consistent with the amount of crop determined from the satellite images. Similarly, as another example, the agricultural computer system 216 may be in receipt of yield data of the various fields 203 and can make a similar determination of whether the sensor data from the carbon sequestration systems 206a and 206b are in line or consistent with the yield data.

FIG. 3 is a block diagram that illustrates a computer system 300 upon which one or more embodiments of the present disclosure may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), liquid crystal display (LCD), light emitting diode (LED), etc., for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device may, for example, have two degrees of freedom in two axes, a first axis (e.g., x, etc.) and a second axis (e.g., y, etc.), that allows the device to specify positions in a plane. The input device 314, more generally, includes any device through which the user is permitted to provide an input, data, etc., to the computer system 300.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infrared data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

With that said, it should be appreciated that the functions described herein, in some embodiments, may be described in computer executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the steps/operations recited in the claims.

Examples and embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more example embodiments disclosed herein may provide all or none of the above mentioned advantages and improvements and still fall within the scope of the present disclosure.

Specific values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may also be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "in communication with," or "included with" another element or layer, it may be directly on, engaged, connected or coupled to, or associated or in communication or included with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A carbon sequestration system comprising:
   a crop residue pickup configured to ingest crop residue disposed on a field;
   a pyrolyzer configured to receive the crop residue outputted from the crop residue pickup and process the crop residue into biochar;
   a biochar/water or slurry mixing system configured to receive the biochar outputted from the pyrolyzer and quench the biochar in water and/or slurry;
   a soil injection system configured to receive the quenched biochar from the biochar/water or slurry mixing system and inject the quenched biochar into the field; and
   one or more sensors configured to detect one or more operations states of the crop residue pickup, the pyrolyzer, the biochar/water or slurry mixing system, and/or the soil injection system.

2. The carbon sequestration system of claim 1, further comprising a mobile platform on which at least one of the crop residue pickup, the pyrolyzer, the biochar/water or slurry mixing system, the soil injection system, and the one or more sensors are seated.

3. The carbon sequestration system of claim 2, wherein the mobile platform further comprises an internal combustion engine and/or an electric motor.

4. The carbon sequestration system of claim 1, wherein the crop residue pickup further comprises a pickup header.

5. The carbon sequestration system of claim 1, wherein the pyrolyzer is configured to heat the crop residue to above 600 degrees Fahrenheit.

6. The carbon sequestration system of claim 1, further comprising an outgas recovery configured to feed volatile gases driven off from the crop residue into a fuel intake of the pyrolyzer.

7. The carbon sequestration system of claim 1, wherein the slurry further comprises manure slurry.

8. The carbon sequestration system of claim 1, wherein the soil injection system further comprises:
   injection tines configured to inject the quenched biochar into the field; and
   hydraulics configured to control heights of the injection tines.

9. The carbon sequestration system of claim 8, wherein the one or more sensors further comprises an injection system depth sensor configured to detect depths of the injection tines.

10. The carbon sequestration system of claim 9, further comprising an agricultural computing platform communicatively coupled to the injection system depth sensor and configured to:
    determine that no biochar is injected into the field when the injection system depth sensor detects that the injection tines are in an "up" position; and
    determine that the biochar is injected into the field when the injection system depth sensor detects that the injection tines are in an "down" position.

11. The carbon sequestration system of claim 1, wherein the one or more sensors further comprises at least one of:
    a crop residue pickup sensor configured to detect an amount of the crop residue being ingested by the crop residue pickup;
    a pyrolyzer temperature sensor configured to detect a temperature inside the pyrolyzer;
    a flow sensor configured to detect an amount of the water or an amount of the slurry flowing to the biochar/water or slurry mixing system from a tank;
    a biochar quantity sensor configured to detect an amount of the biochar outputted from the pyrolyzer; and
    a location sensor configured to detect a location of the carbon sequestration system.

12. The carbon sequestration system of claim 11, wherein the flow sensor further comprises a valve and/or a flow meter.

13. The carbon sequestration system of claim 11, wherein the biochar quantity sensor further comprises a toothed wheel configured to be turned by the biochar falling through the toothed wheel.

14. The carbon sequestration system of claim 11, wherein the biochar quantity sensor further comprises a receptacle configured to be emptied when a weight of the biochar in the receptacle reaches a threshold.

15. The carbon sequestration system of claim 11, wherein the biochar quantity sensor further comprises:
    a light source disposed on a first side of a path of the biochar flowing from the pyrolyzer to the biochar/water or slurry mixing system; and
    a light sensor disposed on a second side of the path of the biochar, and
    wherein the biochar quantity sensor is configured to detect, using the light source and the light sensor, an amount of light outputted by the light source that is intercepted by the biochar.

16. The carbon sequestration system of claim 1, further comprising an initiating fuel source in fluidic communication with the pyrolyzer, and wherein the one or more sensors further comprises an initiating fuel source valve sensor configured to detect whether a valve of the initiating fuel source is open.

17. A method of carbon sequestration, comprising:
ingesting crop residue disposed on a field using a crop residue pickup;
processing the crop residue into biochar using a pyrolyzer;
quenching the biochar in water and/or slurry using a biochar/water or slurry mixing system;
injecting the quenched biochar into the field using a soil injection system; and
detecting, by one or more sensors, one or more operations states of the crop residue pickup, the pyrolyzer, the biochar/water or slurry mixing system, and/or the soil injection system.

18. The method of claim 17, wherein the processing of the crop residue into the biochar further comprises:
heating the crop residue to above 600 degrees Fahrenheit.

19. The method of claim 17, further comprising at least one of:
detecting an amount of the crop residue being ingested using a crop residue pickup sensor;
detecting a temperature inside the pyrolyzer using a pyrolyzer temperature sensor;
detecting an amount of the water or an amount of the slurry flowing to the biochar/water or slurry mixing system from a tank using a flow sensor; and
detecting an amount of the biochar outputted from the pyrolyzer using a biochar quantity sensor.

20. The method of claim 19, wherein the biochar quantity sensor further comprises a toothed wheel configured to be turned by the biochar falling through the toothed wheel.

\* \* \* \* \*